United States Patent [19]
Randolph

[11] Patent Number: 5,736,942
[45] Date of Patent: Apr. 7, 1998

[54] KEY PAD FOR COMMUNICATING WITH A MICROPROCESSOR

[76] Inventor: Glenn Edgar Randolph, 5234 Furman Pl., Charlotte, N.C. 28210

[21] Appl. No.: 686,393

[22] Filed: Jul. 25, 1996

[51] Int. Cl.$^6$ .............................. H03K 17/94; H03M 11/00
[52] U.S. Cl. ........................... 341/22; 341/23; 364/188; 364/471.02
[58] Field of Search .................... 341/23, 22; 345/168, 345/337; 364/188, 189, 146, 471.02; 340/525; 368/1–9

[56] References Cited

U.S. PATENT DOCUMENTS

| | | | |
|---|---|---|---|
| 3,928,844 | 12/1975 | Meihofer | 340/415 |
| 3,995,953 | 12/1976 | Kawai | 355/14 |
| 4,176,941 | 12/1979 | Breitenkam et al. | 340/675 |
| 4,648,028 | 3/1987 | DeKlotz et al. | 364/188 |
| 4,942,535 | 7/1990 | Francisco | 364/188 |
| 4,991,077 | 2/1991 | Kawasaki et al. | 364/188 |
| 5,027,293 | 6/1991 | Fung et al. | 364/550 |
| 5,103,215 | 4/1992 | Taylor et al. | 340/525 |
| 5,182,597 | 1/1993 | Masuda et al. | 355/205 |
| 5,321,602 | 6/1994 | Francisco | 364/188 |
| 5,355,307 | 10/1994 | Scharnhorst | 364/188 |
| 5,388,268 | 2/1995 | Beach et al. | 395/700 |
| 5,446,450 | 8/1995 | Knutson | 340/635 |

*Primary Examiner*—Michael Horabik
*Assistant Examiner*—Timothy Edwards, Jr.
*Attorney, Agent, or Firm*—Kennedy, Covington, Lobdell & Hickman, LLP

[57] ABSTRACT

An keypad facilitates communication between an operator and a microprocessor of an operator-controlled machine, such as a printing press, that is used to monitor and record real time data for the machine. The keypad includes a plurality of function keys and a light guide associated with each function key. The lighting guides are activated by the microprocessor that correspond to selectable function keys by the operator in response to the status of the machine. The lighting guides thereby assist the operator in deciding which function key to choose. The function keys of the keypad are also color and a pattern coded and light indicators are included with the keypad which are activated by the microprocessor to broadcast a lighting status for the status of the machine. The light indicators and function keys are coordinated so that an operator, by observing the colors and patterns of a particular function key, will know what lighting status will be broadcast when that particular function key is selected. The method of activating lighting guides associated with selectable function keys in response to a status of the machine, and the method of activating light indicators to broadcast a lighting status of the status of the machine and the corresponding selecting of the appropriate function key based on its color and pattern coding, are also disclosed. Combination of light indicators, color coded and pattern coded function keys, and light guides make operation of the keypad and machine easy and efficient for operators of any educational background.

17 Claims, 2 Drawing Sheets

KEY PAD FOR COMMUNICATING WITH A MICROPROCESSOR

FIELD OF THE INVENTION

The present invention relates to the communication of a user with a microprocessor and, move specifically, to a keypad used to communicate with a microprocessor used to monitor and record real time data for machinery such as printing presses, rewinders, slitters, and other various types of paper printing production equipment.

BACKGROUND OF THE INVENTION

Paper printing machinery such as a printing press is currently controlled by an operator through control buttons that control the various functioning of the machine and the operator typically logs on paper any time spent repairing the machine if production efficiency for the particular printing job is to be measured. There is a current trend in the industry, however, to incorporate microprocessors into the machine in order to monitor and record "real time" data with respect to the jobs and projects being performed by the machines, i.e., use of a microprocessor to monitor and record job and project data to determine on demand current job and project running times, prepress setup times, idle times, and down times due to maintenance, employee breaks, and malfunctions. The real time data subsequently can be used with respect to a particular machine or a group of machines to immediately compute analytical benchmarks such as production efficiency. This incorporation of a microprocessor into a production machine for this purpose is known in the industry as a direct machine interface (DMI).

Because the average education of many machine operators includes only a high school education at best, especially in the paper printing industry, the incorporation of computers into these machines often requires extensive education of the operators with respect to the operation of the microprocessors through keypad controllers. For instance, if a web break occurs in a machine such as a printing press, the operator must be trained to indicate on the keypad that the machine has stopped because of a web break, as opposed to, fix example, a roll change, a cylinder change, or an ink problem.

Currently there is a need in the paper printing industry for a simple method and corresponding keypad by which an operator can indicate to a microprocessor associated with a paper printing machine the relevant information needed by the microprocessor for properly recording real time data. Furthermore, there is a need for a simple method and corresponding keypad by which operators can be conditioned to efficiently indicate the relevant information to a microprocessor for recording real time data while minimizing the time required to educate the operators.

SUMMARY OF THE INVENTION

The present invention achieves these goals by providing guiding lights on the keypad which indicate to an operator, from all of the keys on the keypad, only those specific function keys that can be selected by the operator. The present invention thus comprises a keypad that includes a plurality of function keys with a light guide individually associated with each function key. Furthermore, the microprocessor communicates with the keypad to provide an output signal that selectively activates only those light guides associated with function keys for which selection is appropriate by the operator. Thus, an operator need only determine which function key to select among those function keys for which light guides are activated, and the operator need not compound the decision by considering any of the other numerous function keys for which light guides are not activated. The light guides thereby assist the operator in selecting the appropriate function key by distinguishing the function keys that are selectable from those function keys that are not selectable.

A further feature of the present invention includes light indicators that are selectively activated by the microprocessor in response to the status of the machine. The light indicators thereby broadcast a lighting status indicative of one of a plurality of predefined statuses of the machine for view at a distance by an operator or an operator's supervisor.

Yet another feature of tire present invention includes each function key coded to identify the lighting status that would be activated by the microprocessor if the function key were selected. Thus, an operator can determine what lighting status a machine will be entering into simply by viewing the coding of the function key. Preferably, the function keys are coded by color and pattern. As a result of this color coordination between the lighting status and the function keys, when the operator uses the system of the present invention over a period of time, the then-experienced operator will be automatically conditioned to respond to a lighting status of the machine by instinctively knowing what lighting status is desired next, thus narrowing the selection of the function keys down to those function keys which indicate the desired lighting status. In other words, the broadcasting of a lighting status trains the operator to think in terms of the lighting status when thinking of the status of the machine. This acquired knowledge consequently and unconsciously limits the operator's decision of which function keys to select from all of tire available function keys, thereby limiting the time required to make a decision and thereby increasing tire efficiency of the operator's response time to the status of the machine broadcast by the light indicators.

Furthermore, when these features of the present invention described above are combined, an operator can summarily rule out most, if not all, of the function keys in selecting a function key in response to a particular status of the machine broadcast by the microprocessor.

The present invention also includes the novel method of communication between the operator and machine, as briefly described above and detailed below.

DETAILED DESCRIPTION OF THE PREFERRED EMBODIMENT

Figure 1:
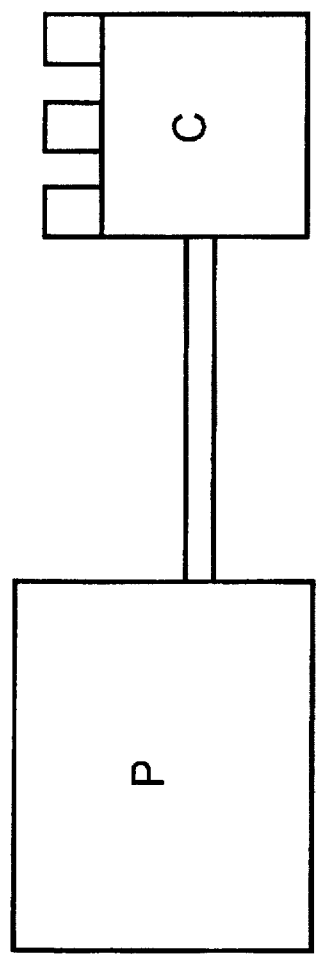
FIG. 1 is a schematic representation of the control panel of the present invention attached to a printing press.

Referring now to the drawings, the preferred embodiment of the present invention will be described. FIG. 1 shows a printing press P of the present invention that is controlled by an operator through a control panel C which includes a conventional stop button 18 for stopping the running of the machine and a conventional start button 20 for the starting of the running of the machine. The control panel C also includes a keypad 10 that communicates with a conventional microprocessor (not shown) and includes a plurality of keys 12, of which there are a plurality of function keys 14. The keypad 10 also includes a corresponding plurality of light guides 16, each function key 14 being individually associated with one of the light guides 16.

The microprocessor is incorporated into control panel C of the printing press P for the monitoring and recording of real time data, including the monitoring and recording of the time periods for the various statuses of the printing press P, i.e., running time, down time due to breakdowns of the printing press P, down time due to operator breaks, down time due to idle time, down time for job setup, and down time awaiting supervisory review. Hence, when a job has been completed, the microprocessor will have the total number of hours that the printing press P was running, the total number of hours that the printing press P was in idle time, the total number of hours that the printing press was being worked on and the problem that was fixed, the total number of hours that the printing press P was being setup in prepress, the total number of hours that the operator was on break and the printing press P was inactive, the total number of hours of duration between when an operator requested supervisory review and a supervisor conducted review, and the total number of hours each operator logged on the printing press P.

An operator of the machine is responsible for indicating to the microprocessor the appropriate predefined status of the machine for which each elapsed time period monitored by the microprocessor is to be recorded. The only exception, preferably, is that a conventional sensor is provided that indicates to the microprocessor whether the printing press is running or stopped. Thus, the microprocessor does not record running time when the printing press has in that stopped, even though the operator has not yet observed and indicated this fact to the microprocessor. Other than determining through this sensor that the printing press P is stopped—a simple determination, the microprocessor cannot determine why a printing press P is stopped.

The operator indicates the status of the printing press to the microprocessor by way of the keypad, which preferably includes a row of the following function keys 14 for identifying various statuses of the machine and other relevant information to the microprocessor: an "Emp. ID" key 22 (employee identification key) for indicating a new operator shift, a "Prepress" function key 24 for indicating setup time, an "Apr. ID" function key 26 (approval identification key) for indicating the waiting period for supervisory review, a "Stops" function key 28 (stop cause key) for indication down time due to a problem with the printing press, a "Break" function key 30 for indicating a break for the operator, an "Idle Time" function key 32 for indicating idle time, a "Run" function key 36 for indicating production time, and a "Yes/OK" key 36 for indicating other various information to the microprocessor.

The keypad 10 also includes a rectangular formation of other keys 38 for entering information but which are not considered function keys herein, such other keys 38 including numeric keys 40, an "ESC" key 42, a "Job Que" key 44, a Scroll Up key 46, a Scroll Down key 48, a clear key 50, and an enter key 52. When a key is selected by an operator, the keypad communicates the key selection to the microprocessor.

One feature of the present invention includes the aforesaid column of eight light guides 16 disposed on the keypad 10, each light guide 16 comprising a light emitting diode (LED). Furthermore, a label 54 appears beside each LED 16 and corresponds identically in colors and patterns with a function key 14 with which it and its corresponding LED 16 are associated. Each LED 16 is furthermore selectively activated by the microprocessor to indicate what function keys 14 are available for the operator to select and to indicate what function key 14 has in fact been selected, as described in further detail below. If desired, the LEDs 16 may be positioned by each function key 14 or the the function keys 14 themselves may be illuminated, rather than locating each LED 16 adjacent a label 54 representing a function key 14.

Figure 2:
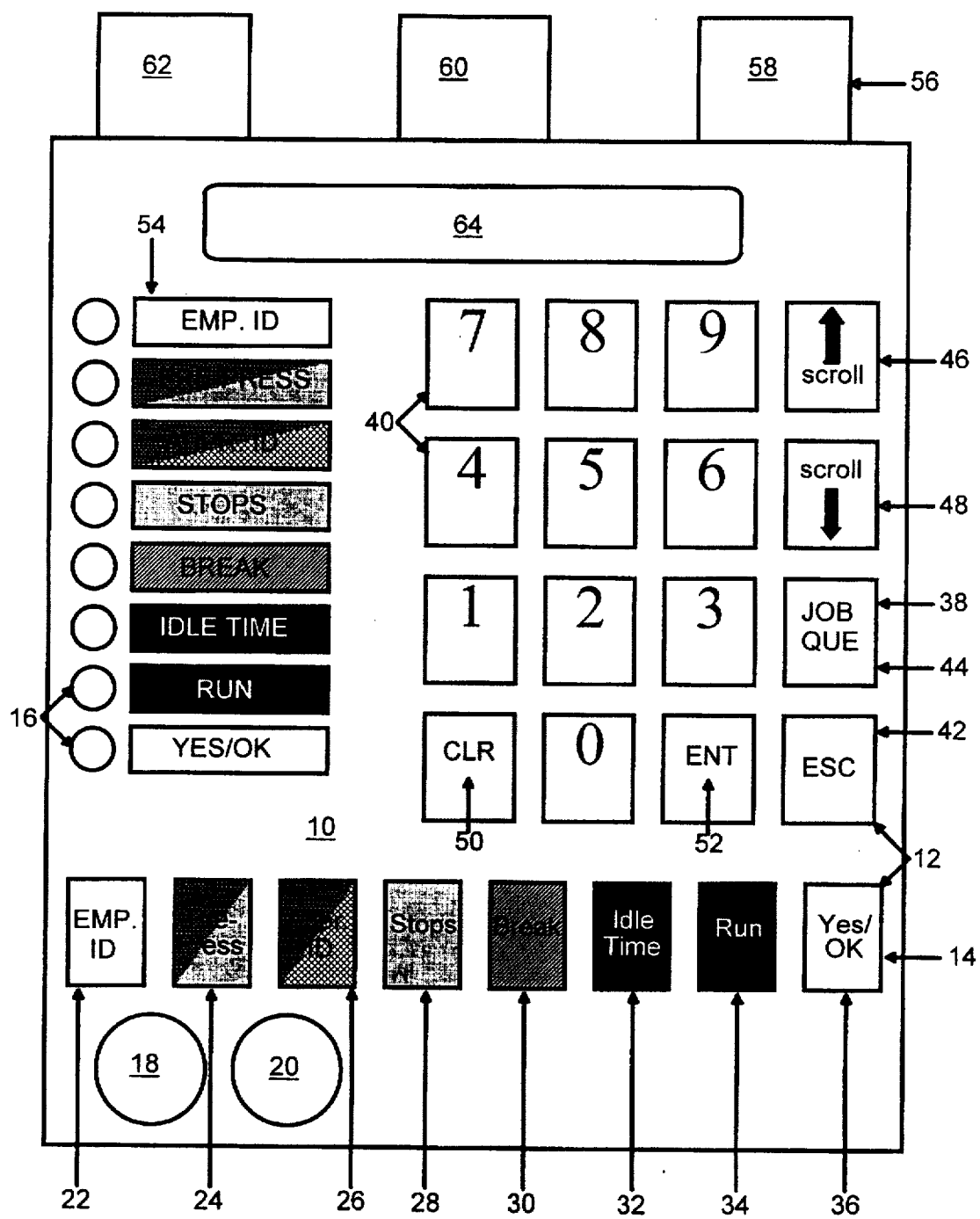
FIG. 2 is a detailed plan view of the control panel of FIG 1.

Another feature of the present invention includes a plurality of light indicators 56, and preferably three color light indicators 56 of different colors, i.e., an emerald light indicator 58, an amber light indicator 60, and a ruby light indicator 62. The color light indicators 56 are mounted so that they are visible from a distance when activated, and preferably are mounted to the top of the control panel C as shown in FIG. 2. Each light indicator 56 of the preferred embodiment has three states: a continuously activated state (on), an intermittently activated state (flashing), and a deactivated state (off). The states of the three color light indicators 56 together form the lighting statuses of the printing press, preferably with each lighting status representing a unique status of the printing press.

The microprocessor controls which light indicators 56 are selectively activated, either continuously or intermittently, to broadcast the status of the printing press. The microprocessor furthermore senses the operational condition of the printing press by a conventional sensor (not shown) disposed on the printing press to determine if the printing press is running, and broadcasts a lighting status (flashing amber) if the printing press P is not running and a status has not been selected by the operator indicating to the microprocessor why the printing press P is not running.

The purpose of the light indicators 56 is twofold. First, the light indicators 56 are designed to inform an operator or an operator's supervisor of the status of the printing press P at a glance, and second, the light indicators 56 condition the operator to associate the various predefined statuses of the printing press P with the lighting statuses. This subconscious association formed by the operator assists the operator in selecting an appropriate function key by color and pattern in response to the statuses of the printing press P broadcast by the microprocessor, as described in greater detail now.

The function keys 14 of the keypad 10 are preferably color and pattern coded, the colors of each function key 14 being indicative of the color light indicators 56 that would be activated by selecting the function key 14, and the pattern of each color being indicative of the activation state of the color light indicators 56, i.e., continuous or intermittent. Thus, the colors and patterns of each function key 14 identify lighting status. Furthermore, in FIG. 2, a solid amber color is indicated by a light shading, a solid emerald color is indicated by medium shading, and a solid ruby color is indicated by dark shading. Moreover, amber in dotted pattern is represented by a cross-hatch shading, emerald in dotted pattern is represented by angular shading, and ruby in dotted pattern is represented by brick shading, as illustrated in FIG. 2 and as described in greater detail below.

Thus, in the preferred embodiment, the Break key 30 is emerald and indicates that if the function key 14 is selected, then the lighting status of the printing press P will be represented by the activation of the emerald light indicator 58. Furthermore, since the Break key 30 is solid colored in pattern, the activation of the emerald light indicator 58 will be continuous. On the other hand, the Apr ID key 26 is ruby and amber colored, each in a dotted pattern. If the Apr ID key 26 is selected, then the lighting status of the printing press P will be represented by the intermittent activation of the ruby light indicator 62 and intermittent activation of the amber light indicator 60.

Detailed operation of the preferred embodiment of the present invention for illustration purposes will now be described with reference to three representative examples, but it will be understood that there are a variety of possible lighting statuses, lighting states (on, off, flashing) and colors and patterns of the function keys 14 and light indicators 56 which can be used so long as the light indicators 56 and function keys 14 are coordinated in accordance with the present invention.

When the printing press P is running, the microprocessor senses by way of the conventional sensor that the printing press P is running and it consequently activates continuously the emerald light 58 indicator and deactivates the amber and ruby light indicators 60,62, i.e., the lighting status of the printing press P is emerald. During this status of the printing press P, the LED 16 associated with the Run function key 34 is continuously activated by an output signal from the microprocessor to indicate that the printing press P is running. The LED 16 associated with the Emp ID key 22 is also intermittently activated by the output signal from the microprocessor to indicate that the Emp ID key 22 is an appropriate function key 14 that can be selected while the printing press P is running. The Emp ID key 22 is colorless to indicate that if the Emp ID key 22 is selected, then no change in the lighting status of the printing press P will occur, the Emp ID key 22 being selected if the operator's shift is ending and another operator's shift is beginning, thus not requiring that the printing press P be halted. Other than the LED 16 associated with the Emp ID key 22, no other LED 16 is intermittently activated while the printing press P is running.

If the operator stops the printing press P by pushing a conventional stop button 18 located on the control panel C, then the microprocessor senses that the printing press P has stopped. In response to this operational condition of the printing press P, the microprocessor subsequently generates an output signal to the LEDs representative that the printing press P is stopped, and the output signal intermittently activates the Emp ID key 22, Stops key 28, Break key 30, Idle key 32, and the Run key 34 thereby indicating that these function keys 14 are appropriate function keys 14 for selection. Moreover, in essence, the microprocessor prompts the operator with the flashing amber light indicator 60 to indicate to it why the printing press P has stopped so that the down time can be properly allocated to the correct reason, i.e., the appropriate status of the machine. Thus, if the operator has stopped the printing press P to go on break, then the break key 30 is selected. If the operator has stopped the printing press P because of a problem with the printing press, then the Stops key 28 is selected, and if the printing press is to go into idle time, the Idle Time key 32 is selected. The function key 14 selected by the operator generates an input signal to the microprocessor that identifies to the microprocessor the appropriate status of the machine. Alternatively, if the stop button 18 was inadvertently pressed, then the start button 20 is depressed and the Run key 34 is selected, the operator thereby restarting the printing press P.

For purposes of illustration, if the Stops key 28 is selected, then the microprocessor continuously activates the amber light indicator 60 to broadcast an amber lighting status. The amber lighting status represents that the printing press P has been stopped due to a problem with the printing press P. Moreover, the Stops function key 28 is solid amber to indicate to the operator the lighting status of the stops function before selection of the Stops function key 28.

Consequently, when an experienced operator observes the flashing amber lighting status and sees that a web break, for example, has occurred, then the operator is conditioned to know that a solid amber function key 14 is an appropriate response to the flashing amber lighting status, solid amber representing a problem with the printing press P. Furthermore, the LED 16 associated with the Stops key 28 is intermittently activated by the microprocessor to indicate to the operator that the Stops key 28 is an appropriate selection.

Assuming now that the printing press has been stopped due to a problem with the printing press P, such as, for example, a web break, the operator must indicate this information to the microprocessor for the recording of accurate and detailed real time data. The manner of choosing a stop cause from a list of stop causes is not a feature of the present invention and may be done by any conventional method. For purposes of illustration herein, a display 64 is preferably included on the control panel C and means such as the Scroll Up key 46 and Scroll Down key 48 are provided for choosing a stop cause from those displayed on a display 64. For instance, having selected the Stops key 28, the display 64 on the control panel C queries the operator whether the stop is caused by a cylinder change. Selecting the Scroll Up key 46, the operator toggles to the next screen of the display which inquires whether the stop is caused by a roll change. Selecting the Scroll Up key 46 again brings the display to the web break screen, at which point the operator selects the Yes/OK function key 36. Furthermore, since the Yes/OK key 36 is used to choose the stop cause after the Stops key 28 has been selected, the LED 16 associated with the Yes/OK key 36 is intermittently activated by the microprocessor after the Stops key 28 has been selected to prompt the operator to choose a stop cause. Furthermore, the lighting status of the printing press P does not change when the operator identifies the stop cause to the microprocessor by selecting the Yes/OK key 36, and consequently the Yes/OK key 36 is colorless. Once the stop cause has been chosen by selecting the Yes/OK function key 36 to identify the stop cause to the microprocessor, the operator then proceeds to correct the problem.

When a stop cause has been identified for the microprocessor by the operator as set forth above, the microprocessor intermittently activates the LED 16 associated with the Run key 34, thereby indicating to the operator that this key may be selected when the problem that caused the printing press P to stop has been fixed. Furthermore, the flashing of the LED 16 associated with the Run key 34 prompts the operator to fix the stop cause so that the printing press P may be restarted. Thus, as is now evident from the foregoing example, the microprocessor is able to record the down time of the printing press P that is spent fixing a particular problem.

Some stop causes require the supervisory review of the repair before restarting the printing press P, namely, stops due to mechanical problems, electrical problems, cylinder changes, or color changes, and also the stop due to the completion of the printing job, while the other stop causes do not require supervisory review, namely, roll changes, web breaks, and ink problems. When a stop cause is chosen by the operator that requires supervisory review, then the LED 16 associated with the Apr ID key 26 is activated intermittently by the microprocessor instead of the Run key 34, thereby prompting the operator to fix the problem and then seek supervisory review.

When the Apr ID key 26 is selected, which is half amber and half ruby, each in dotted pattern, the microprocessor intermittently activates both the amber light indicator and the ruby light indicator to broadcast a flashing amber/ flashing ruby lighting status, thereby indicating to a supervisor that review is required to bring the printing press P back into production. The microprocessor also continuously activates the LED 16 associated with the Apr ID key 26 and intermittently activates the LED 16 associated with the Run key 34. When the supervisor enters his approval id number, the operator may then select the Run key 26 as indicated by the associated blinking LED 16 and restart the printing press P. Thus, the microprocessor is able to record the down time spent awaiting supervisory review.

For purposes of further illustration, now assume that the Break key 30 is selected rather than the Stop key 28 when the printing press P is stopped, when the flashing amber lighting status is simultaneously broadcast, and when the Emp ID key 22, Stops key 28, Break key 30, Idle key 32, and the Run key 34 simultaneously are intermittently activated. Upon selection of the Break key 30, which is colored emerald in dotted pattern, the microprocessor deactivates the flashing amber light indicator 60 and intermittently activates the emerald light indicator 58. Thus, the flashing emerald lighting status indicates that an operator is on break. Furthermore, the microprocessor activates continuously the LED 16 associated with the Break key 30 and intermittently activates the LED 16 associated with the Run key 34, the function key that must be selected for an operator to come back from a break. Thus, the down time spent while an operator is on break is recorded by the microprocessor.

For a final illustration, suppose that instead of selecting the Stops key 28 or Break key 30, the operator selects the Idle Time key 32 because of an outside delay that keeps the printing press P from returning to its running mode, such as when the printing press runs out of paper and further paper has yet to arrive. The Idle Key 32 is solid ruby, and when the key is selected to generate an input signal to the microprocessor, the microprocessor activates continuously the ruby light indicator 62 to broadcast a ruby lighting status. The microprocessor also activates continuously the LED 16 associated with the Idle Time key 32 and intermittently activates the LED 16 associated with the Apr ID key 26 because supervisory review is required to bring a printing press P out of idle time. Once again, as detailed above, when the Apr ID key 26 is selected, the microprocessor intermittently activates both the amber light indicator 60 and the ruby light indicator 62 to broadcast a flashing amber/flashing ruby lighting status, thereby indicating to a supervisor that review is required to bring the printing press P back into production. The microprocessor also activates continuously the LED 16 associated with the Apr ID key 26 and intermittently activates the LED 16 associated with the Run key 34. When the supervisor enters his approval id number, the operator may then select the Run key 34 as indicated by the associated blinking LED 16 and restart the printing press P. Thus, the down time spent while the printing press P is idle and the down time spent waiting for supervisory review is recorded by the microprocessor.

Preferably, in each illustration, when the Run key 34 is selected to indicate the starting of the printing press, the microprocessor senses whether the printing press indeed begins running. If for some reason the printing press P is not ready to run when the Run key 34 is selected and run button 20 is depressed, the microprocessor intermittently activates the amber light indicator 60 to broadcast a flashing amber lighting status, thereby prompting the operator to indicate to the microprocessor what the status of the printing press is, i.e., why it is not running.

Thus, it can be seen to one of ordinary skill in the art that there are many variations of the preferred embodiment described in detail herein. For instance, the activation, either continuously or intermittently, of the LEDs 16 could be simultaneous or sequenced. Various sequencing could also be applied to the activation of the light indicators 56. As described above, the LEDs 16 could be replaced by illuminatable function keys 14, or the LEDs 16 could be positioned by the function keys 14 themselves. Moreover, the Stops key 28 and Run key 34 could be used to actually control the stopping and starting of the printing press P, thereby eliminating the stop and start buttons 18,20. The present invention is also not limited to a keypad. For instance, the keypad 10 could be replaced by a touch screen wherein the function keys 14 would be represented by icons or other entering means on the touch screen, would be color and pattern coded, and would be highlighted when selectable.

Based on the foregoing detailed operation, the novel method of the present invention includes the activating with the microprocessor of light guides on the keypad, each light guide being individually associated with one of the function keys and each light guide being activated for which its respective function key is selectable by the operator in response to the status of the machine. The novel method of the present invention also includes the activating with the microprocessor of a plurality of light indicators associated with the machine to thereby broadcast a lighting status representative of the status of the machine, and the selecting of a function key based on the colors of the function key in response to the lighting status broadcast by the light indicators.

It will therefore be readily understood by those persons skilled in the art that the present invention is susceptible of a broad utility and application. Many embodiments and adaptations of the present invention other than those herein described will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. An interface system for facilitating communication between an operator and a microprocessor used to monitor and record real time data of a paper printing production machine for performing a project, comprising:

a microprocessor for monitoring and recording time periods for each one of a plurality of predefined statuses of the machine occurring during the performance of the project;

a plurality of light guides for receiving an output signal from the microprocessor, each said output signal illuminating predetermined ones of said light guides, each said light guide being representative of one of said plurality of predefined statuses, and a plurality of function keys each selectable by the operator for generating an input signal to the microprocessor identifying one of said plurality of predefined statuses of the machine, each said function key being individually associated with one of said light guides so that an input signal can be processed by the microprocessor only from a function key associated with an illuminated light guide, whereby said microprocessor records the time period being monitored with the predefined status of the machine identified by the operator.

2. An interface system according to claim 1, wherein said light guides are intermittently illuminated by the microprocessor to identify to the user said function keys from which a said input signal can be processed by the microprocessor.

3. An interface system according to claim 2, wherein the microprocessor continuously illuminates one of said light guides to identify to the user said function key from which an input signal is processed by the microprocessor.

4. A method of facilitating communication between an operator and a microprocessor used to monitor and record real time data of a paper printing production machine used for performing a project, comprising the steps of:

providing a microprocessor for monitoring and recording time periods for each one of a plurality of predefined statuses of the machine occurring during the performance of the project;

providing a plurality of light guides for receiving an output signal from the microprocessor, each said output signal illuminating predetermined ones of said light guides, each light guide being representative of a predefined status of a machine, providing a plurality of function keys selectable by the operator each generating an input signal to the microprocessor identifying one of the plurality of the predefined statuses of the machine, each said function key being individually associated with one of said light guides so that an input signal can be processed by the microprocessor only from a function key associated with an illuminated light guide, monitoring a time period for one of said predefined statuses of the machine;

generating an output signal illuminating predetermined ones of said light guides to identify to the user possible statuses of the machine, generating an input signal from a function key associated with an illuminated light guide to identify to the microprocessor the status of the machine from said possible statuses of the machine for which said time is being monitored; and recording said monitored time for said identified status.

5. A method according to claim 4, wherein said light guides associated with said function keys from which an input signal can be processed by the microprocessor are intermittently illuminated.

6. A method according to claim 5, wherein said light guide associated with the function key from which an input signal is processed by the microprocessor is continuously illuminated.

7. A color and lighting communication system for facilitating user communication with a microprocessor of a machine, comprising:

color light indicators selectively activated by a microprocessor to broadcast for view by the user one of a plurality of lighting statuses indicative of predefined statuses of the machine, thereby conditioning the user to associate said lighting statuses with said predefined statuses of the machine, and a plurality of function keys, each said function key being color coded to indicate the lighting status that will be broadcast by said light indicators if said function key is selected by the user, said color coded function keys thereby assisting the user in selecting an appropriate function key by distinguishing said function keys that indicate the desired fighting status from said function keys that do not indicate the desired lighting status.

8. A color and lighting communication system according to claim 7, wherein each said lighting status corresponds to a unique status of the machine.

9. A method of assisting an operator in selecting an appropriate function key on a keypad to identify one of a plurality of predefined statuses of a paper printing production machine to a microprocessor used in the paper printing industry for performing a project, comprising the steps of:

providing a microprocessor for monitoring and recording time periods for each one of a plurality of predefined statuses of the machine occurring during the performance of the project, providing color light indicators selectively activated by the microprocessor to broadcast a lighting status indicative of the status of the machine for view at a distance by an operator, providing a keypad communicating with the microprocessor and having a plurality of function keys selectable by the operator, each function key identifying to the microprocessor a certain one of the predefined statuses and each function key being color coded to indicate the lighting status that will be broadcast by the color light indicators if the function key is selected by the operator, activating with the microprocessor a plurality of the light indicators to broadcast a lighting status representative of the status of the machine, and selecting a function key based on the color coding of the function key in response to the lighting status broadcast by the light indicators.

10. The method according to claim 9, wherein the colors of said function key represents the color light indicators that are activated by the microprocessor when the function key is selected.

11. The method according to claim 10, wherein the function keys are pattern coded and further comprising the step of selecting a function key based on the pattern coding of the function key in response to the lighting status broadcast by the light indicators, each color and pattern coded function key identifying the lighting status that is broadcast when the function key is selected.

12. The method according to claim 11, wherein each color and pattern coded function key corresponds to a different predefined status of the machine.

13. The method according to claim 11, wherein a dotted color of a said function key indicates that a corresponding color light indicator will be activated intermittently by the microprocessor when said function key is selected.

14. An interface system of a paper printing production machine used in the paper printing industry for performing a project, comprising:

a microprocessor for monitoring and recording time periods for each one of a plurality of predefined statuses of the machine occurring during the performance of the project, light indicators selectively activated by said microprocessor to broadcast a lighting status indicative of the status of the machine for view at a distance by an operator, and a keypad communicating with the microprocessor and having a plurality of function keys selectable by the operator, each said function key identifying to the microprocessor a certain one of said predefined statuses and each said function key having a color indicative of the lighting status that will be broadcast by said light indicators if said function key is selected by the operator, wherein said light indicators condition the operator to associate lighting statuses with said predefined statuses of the machine and said colors of said function keys thereby assist the operator in selecting an appropriate function key by distinguishing said function keys that indicate the desired lighting status from said function keys that do not indicate the desired lighting status.

15. An interface system of a paper printing production machine used in the paper printing industry for performing a project, comprising:

- a microprocessor for monitoring and recording time periods for each one of a plurality of predefined statuses of the machine occurring during the performance of the project,
- three color light indicators selectively activated by said microprocessor for broadcasting a lighting status representative of the status of the machine for view at a distance by an operator, and
- a keypad communicating with the microprocessor, said keypad having
  - a plurality of function keys selectable by the operator, each said function key identifying to the microprocessor a certain one of said predefined statuses and each said function key having color patterns identifying the lighting status that will be broadcast by said light indicators if said function key is selected, and
  - a plurality of light guides, each said light guide being associated with each said function key and being selectively activated by the microprocessor to identify selectable function keys to the operator, said light guides thereby assisting the operator in selecting the appropriate function key by distinguishing said function keys that are selectable from function keys that are not selectable, wherein said light indicators condition the operator to associate lighting status with status of the machine, said color patterns of each said function key thereby assisting the operator in selecting the appropriate function key by further distinguishing said function keys for which said light guides are activated and identify the desired lighting status from said function keys for which said light guides are activated but do not identify the desired lighting status.

16. An interface system of a paper printing production machine used in the paper printing industry for performing a project, comprising:

- a microprocessor for monitoring and recording time periods for each one of a plurality of predefined statuses of the machine occurring during the performance of the project,
- a plurality of entering means selectable by an operator to indicate to the microprocessor the status for which said time period is being monitored, and
- a plurality of guide means, each said guide means being individually associated with a corresponding one of said entering means and being selectably activated by the microprocessor to indicate to the operator the possible statuses of the machine for which said time period is being monitored.

17. An interface system of a paper printing production machine used in the paper printing industry for performing a project, comprising:

- a microprocessor for monitoring and recording time periods for each one of a plurality of predefined statuses of the machine occurring during the performance of the project,
- light indicators selectively activated by said microprocessor to broadcast a lighting status indicative of the status of the machine for view at a distance by an operator or a supervisor, and
- a plurality of entering means selectable by the operator, each said entering means identifying to the microprocessor a certain one of said predefined statuses and being color coded to indicate the lighting status that will be broadcast by said light indicators if said entering means is selected, wherein said light indicators condition the operator to associate lighting status with status of the machine, said color coding of each said entering means thereby assisting the operator in selecting an appropriate entering means by distinguishing said entering means that indicate the desired lighting status from said entering means that do not indicate the desired lighting status.

* * * * *